(12) United States Patent
Sano et al.

(10) Patent No.: US 11,405,856 B2
(45) Date of Patent: Aug. 2, 2022

(54) USER EQUIPMENT, BASE STATION, AND BROADCAST INFORMATION RECEPTION METHOD

(71) Applicant: NTT DOCOMO, INC., Tokyo (JP)

(72) Inventors: Yousuke Sano, Tokyo (JP); Kazuaki Takeda, Tokyo (JP); Satoshi Nagata, Tokyo (JP); Qin Mu, Beijing (CN); Liu Liu, Beijing (CN); Huiling Jiang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/088,740

(22) PCT Filed: Mar. 29, 2017

(86) PCT No.: PCT/JP2017/013069
§ 371 (c)(1),
(2) Date: Sep. 26, 2018

(87) PCT Pub. No.: WO2017/170774
PCT Pub. Date: Oct. 5, 2017

(65) Prior Publication Data
US 2019/0116547 A1    Apr. 18, 2019

(30) Foreign Application Priority Data
Mar. 31, 2016  (JP) .............................. JP2016-073461

(51) Int. Cl.
*H04W 48/14*   (2009.01)
*H04W 48/10*   (2009.01)
(Continued)

(52) U.S. Cl.
CPC ........... *H04W 48/14* (2013.01); *H04W 24/08* (2013.01); *H04W 28/0215* (2013.01);
(Continued)

(58) Field of Classification Search
None
See application file for complete search history.

(56) References Cited

U.S. PATENT DOCUMENTS 8,331,276 B2 * 12/2012 Lindgren .......... H04W 52/0206
370/311
10,455,621 B2 * 10/2019 Agiwal ............. H04W 74/0833
(Continued)

FOREIGN PATENT DOCUMENTS

CN    101217689 A    7/2008
CN    101796767 A    8/2010
(Continued)

OTHER PUBLICATIONS

Written Opinion of International Searching Authority issued in PCT/JP2017/013069 dated May 16, 2017 (9 Pages).
(Continued)

*Primary Examiner* — Ayaz R Sheikh
*Assistant Examiner* — Faiyazkhan Ghafoerkhan
(74) *Attorney, Agent, or Firm* — Osha Bergman Watanabe & Burton LLP

(57) ABSTRACT

A user equipment in a mobile communication system including a base station and the user equipment, including: a mode determining unit that receives instruction information indicating a transmission mode of broadcast information from the base station and determines the transmission mode based on the instruction information; and a receiving unit that performs a reception operation of the broadcast information according to the transmission mode determined by the mode determining unit.

5 Claims, 11 Drawing Sheets

(51) Int. Cl.
  *H04W 74/08* (2009.01)
  *H04W 76/14* (2018.01)
  *H04W 24/08* (2009.01)
  *H04W 28/02* (2009.01)
  *H04W 88/10* (2009.01)
  *H04W 4/70* (2018.01)

(52) U.S. Cl.
  CPC ........... *H04W 48/10* (2013.01); *H04W 74/08* (2013.01); *H04W 74/0833* (2013.01); *H04W 76/14* (2018.02); *H04W 88/10* (2013.01); *H04W 4/70* (2018.02)

(56) References Cited

U.S. PATENT DOCUMENTS

| | | | | |
|---|---|---|---|---|
| 10,575,226 | B2* | 2/2020 | Kubota | H04W 36/0083 |
| 10,616,822 | B2* | 4/2020 | Kubota | H04W 48/14 |
| 2006/0166694 | A1* | 7/2006 | Jeong | H04W 48/16 455/525 |
| 2011/0201343 | A1* | 8/2011 | Pinheiro | H04W 4/70 455/450 |
| 2011/0269448 | A1* | 11/2011 | Chen | H04W 48/12 455/422.1 |
| 2013/0064157 | A1* | 3/2013 | Lindgren | H04W 52/0216 370/311 |
| 2013/0115913 | A1* | 5/2013 | Lin | H04W 48/02 455/410 |
| 2014/0204866 | A1* | 7/2014 | Siomina | H04L 25/03821 370/329 |
| 2014/0235226 | A1* | 8/2014 | Pinheiro | H04W 52/0209 455/418 |
| 2015/0264665 | A1* | 9/2015 | Vos | H04L 5/00 370/329 |
| 2015/0382284 | A1* | 12/2015 | Brismar | H04W 28/085 370/329 |
| 2016/0309282 | A1* | 10/2016 | Xu | H04W 24/08 |
| 2017/0279646 | A1* | 9/2017 | Yi | H04L 5/22 |
| 2017/0280481 | A1* | 9/2017 | Stern-Berkowitz | H04L 1/1854 |
| 2017/0290016 | A1* | 10/2017 | Yi | H04W 72/042 |
| 2017/0311232 | A1* | 10/2017 | Yi | H04L 5/0044 |
| 2018/0027445 | A1* | 1/2018 | Lin | H04W 48/08 455/410 |
| 2018/0152924 | A1* | 5/2018 | Ouchi | H04W 72/005 |
| 2019/0116547 | A1* | 4/2019 | Sano | H04W 76/14 |
| 2019/0124568 | A1* | 4/2019 | Kubota | H04B 7/0413 |
| 2019/0132884 | A1* | 5/2019 | Agiwal | H04W 74/0833 |
| 2020/0146075 | A1* | 5/2020 | Agiwal | H04W 4/06 |

FOREIGN PATENT DOCUMENTS

| | | |
|---|---|---|
| CN | 103179513 A | 6/2013 |
| JP | 2010-506434 A | 2/2010 |
| WO | 2008044664 A1 | 4/2008 |
| WO | 2013/068369 A1 | 5/2013 |
| WO | 2013/141541 A1 | 9/2013 |

OTHER PUBLICATIONS

International Search Report issued in PCT/JP2017/013069 dated May 16, 2017 (5 Pages).
3GPP TS 36.212 V14.0.0; "3rd Generation Partnership Project; Technical Specification Group Radio Access Network; Evolved Universal Terrestrial Radio Access (E-UTRA); Multiplexing and channel coding (Release 14)"; Sep. 2016 (148 Pages).
3GPP TS 36.331 V14.0.0; "3rd Generation Partnership Project; Technical Specification Group Radio Access Network; Evolved Universal Terrestrial Radio Access (E-UTRA); Radio Resource Control (RRC); Protocol specification (Release 14)"; Sep. 2016 (643 Pages).
3GPP TS 36.213 V14.0.0; "3rd Generation Partnership Project; Technical Specification Group Radio Access Network; Evolved Universal Terrestrial Radio Access (E-UTRA); Physical layer procedures (Release 14)"; Sep. 2016 (406 Pages).
3GPP TS 36.331 V12.8.0; 3rd Generation Partnership Project; Technical Specification Group Radio Access Network; Evolved Universal Terrestrial Radio Access(E-UTRA); Radio Resource Control (RRC); Protocol specification (Release 12); Dec. 2015 (454 Pages).
3GPP TS 36.211 V14.0.0; "3rd Generation Partnership Project; Technical Specification Group Radio Access Network; Evolved Universal Terrestrial Radio Access (E-UTRA); Physical channels and modulation (Release 14)"; Sep. 2016 (170 Pages).
Nortel; "System Information broadcast gating"; 3GPP TSG RAN WG2#56, Tdoc R2-063137; Riga, Latvia,Nov. 6-10, 2006 (5 Pages).
Extended European Search Report issued in counterpart European Patent Application No. 17775308.4, dated Sep. 19, 2019 (9 Pages).
Office Action issued in the counterpart European Patent Application No. 17775308.4, dated Jun. 30, 2020 (5 pages).
Office Action issued in Chinese Application No. 201780020081.3, dated Sep. 11, 2020 (14 pages).
Office Action issued in the counterpart European Patent Application No. 17775308.4, dated Feb. 4, 2021 (7 pages).
NTT DOCOMO, Inc.; "Non-accessible carriers in LTE-A"; 3GPP TSG-RAN2#68, R2-096976; Jeju, South Korea; Nov. 9-13, 2009 (7 pages).
Research In Motion, UK Limited; "System Information Acquisition for Carrier Aggregation"; 3GPP TSG RAN WG2 Meeting #68, R2-096885; Jeju, Korea; Nov. 9-13, 2009 (4 pages).
Office Action issued in Japanese Application No. 2018-509382; dated Apr. 20, 2021 (5 pages).
Office Action issued in the counterpart Japanese Patent Application No. 2018-509382, dated Dec. 22, 2020 (8 pages).
Office Action issued in European Application No. 17775308.4; dated Jun. 4, 2021 (9 pages).

* cited by examiner

FIG.6A

| PREAMBLE | X | Y | Z | ... |
|---|---|---|---|---|
| CORRESPONDING MTC-SIB | MTC-SIB1 | MTC-SIB2 | MTC-SIB3 | ... |

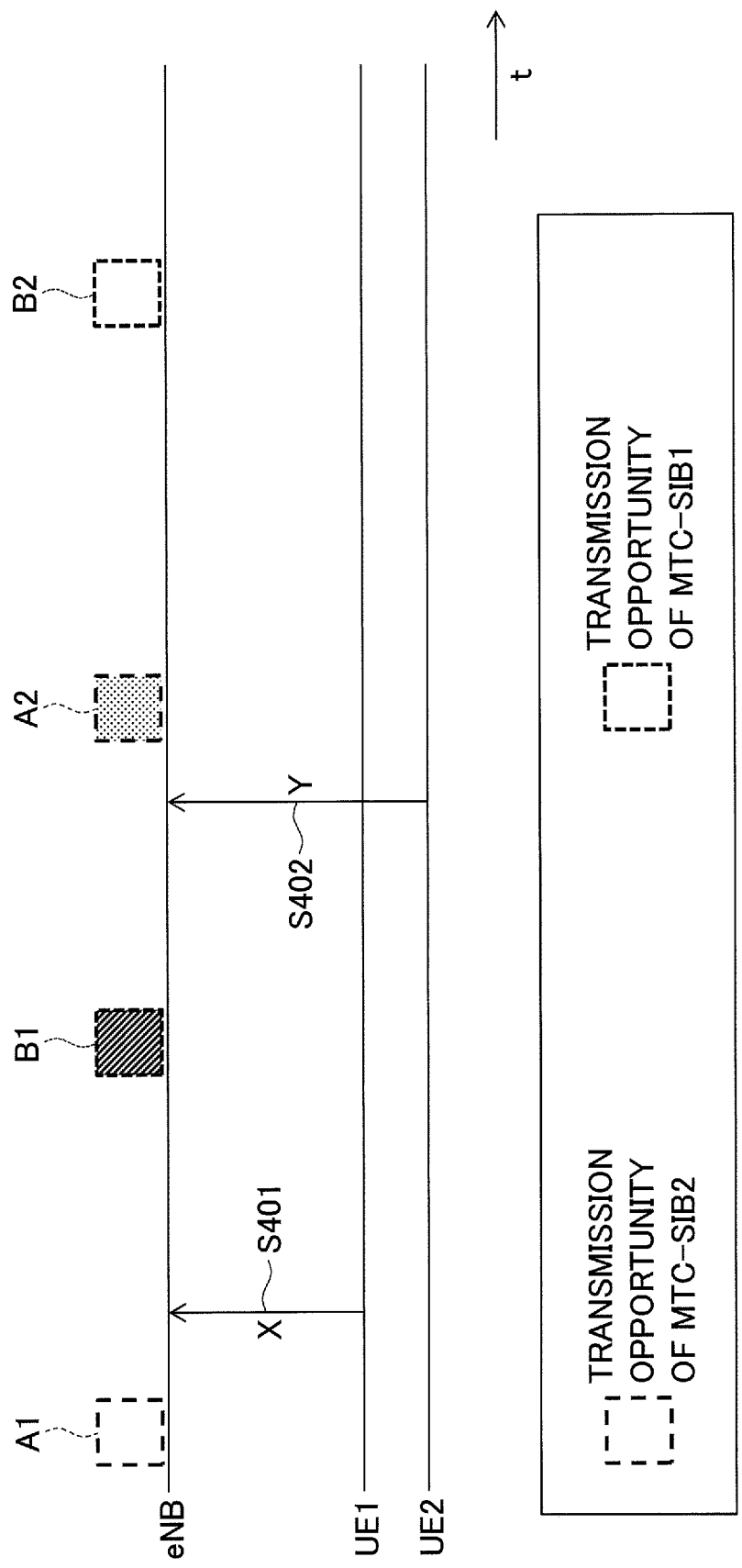

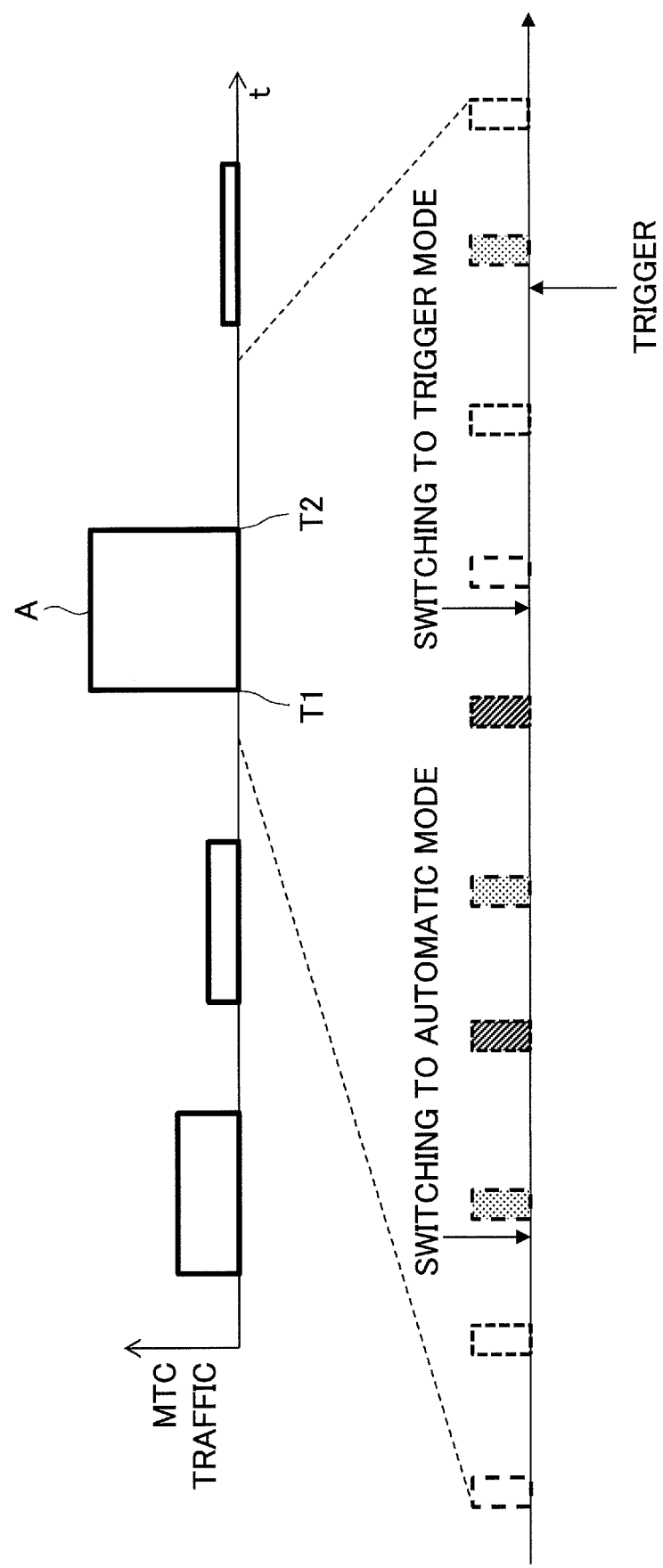

USER EQUIPMENT, BASE STATION, AND BROADCAST INFORMATION RECEPTION METHOD

TECHNICAL FIELD

The present invention relates to a method of transmitting and receiving broadcast information in a mobile communication system.

BACKGROUND ART

In Long Term Evolution (LTE), in order to realize a further increase in a system capacity, a further increase in data transmission rate, a further delay reduction in a radio section, and the like, a next generation radio communication system called 5G is under review.

In 5G, various element techniques are under review to satisfy requirements that the delay of the radio section be 1 ms or less while realizing throughput of 10 Gbps or more. Further, in order to respond to services represented by Internet of things (IoT), an element technique capable of enabling an enormous number of machine type communication (MTC) terminals to perform data transmission via a radio network of 5G is under review. A technique capable of enabling a large number of MTC terminals (hereinafter, MTC-UE and UE are an abbreviation for a user equipment) to access a network is called massive machine-type-communications (mMTC) in 5G.

FIG. 1 is a diagram illustrating an image of a characteristic of traffic (MTC traffic) of an MTC-UE. As illustrated in FIG. 1, in MTC traffic, traffic occurs in a certain period in a bursty manner, and periods other than the period become a small traffic state. As an example, smart meters expected to be used as a large amount of MTC-UEs are considered to perform measurement in the daytime and upload measurement results at a predetermined time of night. In this case, the traffic bursts occur at predetermined times of the night, and the daytime becomes a substantially non-traffic state.

As specified in 3GPP (for example, Non-Patent Document 1), various kinds of system information blocks (SIBs) are transmitted from a base station eNB (hereinafter, "eNB") to a user equipment "UE." Meanwhile, it is under review to introduce a new SIB for MTC-UEs which are supposed to have a lower function than common UEs (hereinafter, "MTC-SIB").

CITATION LIST

Non-Patent Document

Non-Patent Document 1: 3 GPP TS 36.331 V 12.8.0 (2015-12)

SUMMARY OF THE INVENTION

Problem to be Solved by the Invention

As stated in Non-Patent Document 1, the existing SIBs are periodically transmitted from the eNB. However, if the same transmission method as that for the existing SIBs is employed for the MTC-SIB, the MTC-SIB is transmitted even when there is substantially no MTC traffic as illustrated in FIG. 1, and an unnecessary signaling overhead occurs. Further, at the UE side, there is a possibility that power consumption will be increased due to an unnecessary MTC-SIB reception operation. Such a problem is not limited to transmission and reception of the MTC-SIB but can occur even in transmission and reception of general broadcast information.

The present invention was made in light of the foregoing, and it is an object of the present invention to provide a technique capable of reducing unnecessary transmission and reception of broadcast information in a mobile communication system.

Means for Solving Problem

According to the embodiment of the present invention, provided is a user equipment in a mobile communication system including a base station and the user equipment, including: a mode determining unit that receives instruction information indicating a transmission mode of broadcast information from the base station and determines the transmission mode based on the instruction information; and a receiving unit that performs a reception operation of the broadcast information according to the transmission mode determined by the mode determining unit.

Effect of the Invention

According to the embodiment of the present invention, it is possible to reduce unnecessary transmission and reception of broadcast information in a mobile communication system.

BRIEF DESCRIPTION OF DRAWINGS

FIG. 6A is a diagram for describing an exemplary operation related to a trigger;

FIG. 6B is a diagram for describing an exemplary operation related to a trigger;

FIG. 7 is a diagram for describing an exemplary operation associated with MTC traffic;

MODE(S) FOR CARRYING OUT THE INVENTION

Hereinafter, an exemplary embodiment of the present invention will be described with reference to the appended drawings. An embodiment to be described below is merely an example, and an embodiment to which the present invention is applied is not limited to the following embodiment. For example, a mobile communication system of the present embodiment is assumed to be a system of a scheme conforming to LTE, but the present invention is not limited to LTE and applicable to other schemes. In this specification and claims set forth below, "LTE" is used in a broad sense including Releases 8 to 13 of 3GPP or subsequent communication schemes (including 5G).

Further, the present embodiment is targeted on MTC-UE and MTC-SIB, but a technique according to the present embodiment is also applicable to UE and broadcast information other than MTC-UE and MTC-SIB.

Further, in the present embodiment, a term "MIB" is used, but "MIB" in the present embodiment is not limited to an MIB disclosed in Non-Patent Document 1. The "MIB" in the present embodiment may be any broadcast information as long as it is broadcast information having a function of "MIB" to be described below. The broadcast information may be referred to as "system information."

Hereinafter, basically, a base station is denoted by an "eNB", and a user equipment is denoted by a "UE." The eNB is an abbreviation for "evolved Node B", and the UE is an abbreviation for "user equipment." In the present embodiment to be described below, the UE is an MTC-UE.

(System Configuration)

Figure 1:
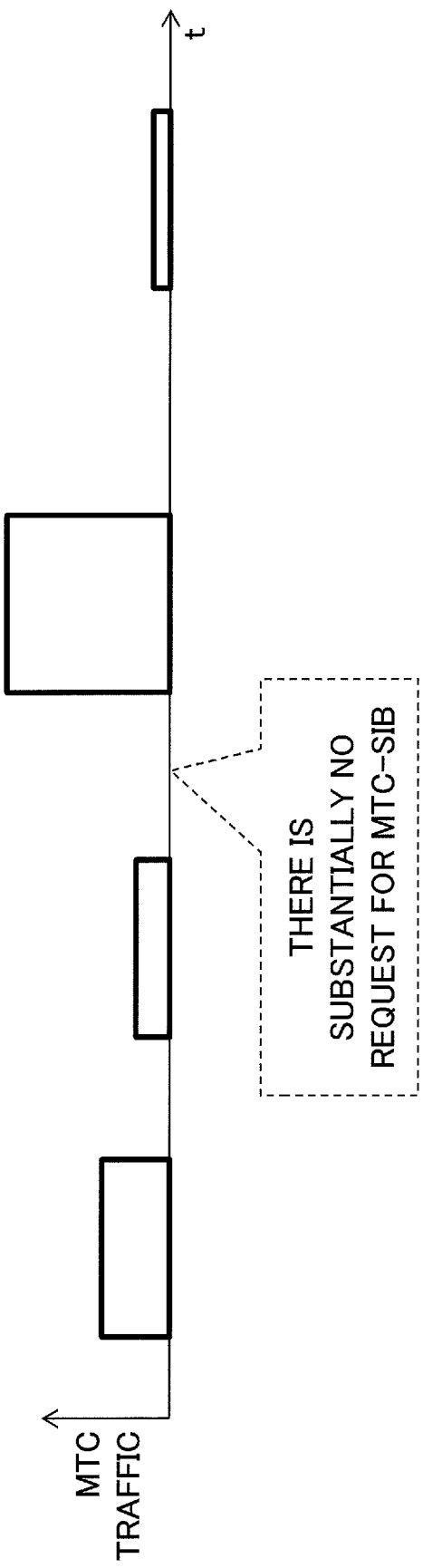
FIG. 1 is a diagram for describing a characteristic of MTC traffic.
Figure 2:
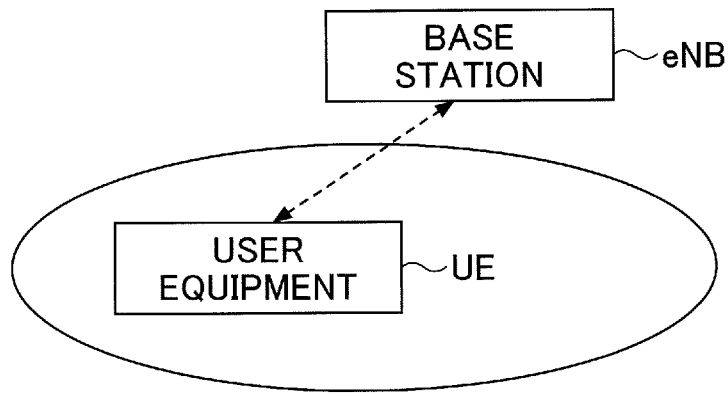
FIG. 2 is a configuration diagram of a mobile communication system according to an embodiment of the present invention.

FIG. 2 illustrates an exemplary configuration of a mobile communication system according to the present embodiment. As illustrated in FIG. 2, the mobile communication system according to the present embodiment includes an eNB forming a cell and a UE performing a radio communication with the eNB. In FIG. 2, one eNB and one UE are illustrated, but these are representatives, and a plurality of eNBs and a plurality of UEs may be provided.

In the present embodiment, the eNB transmits one or more new MTC-SIBs which are not specified in Non-Patent Document 1 using a method to be described below, and the UE receives the new MTC-SIB. However, an operation related to transmission/reception of the MTC-SIB described in the present embodiment can be also applied to the existing SIB or a new SIB other than the MTC-SIB.

In the present embodiment, the transmission of the MTC-SIB is basically performed periodically at a predetermined cycle, similarly to the existing SIB. AN operation of the UE of acquiring (receiving) the MTC-SIB is also similar to the existing operation. For example, when the UE is newly connected to a cell, the UE newly acquires the MTC-SIB. The UE is newly connected to the cell, for example, when cell selection is performed, when cell reselection is performed, when transition from a cell of another radio access technology (RAT) to a cell of E-UTRA, when the UE enters an area within the coverage from an area outside the coverage, or the like.

Further, upon receiving a notification indicating that the MTC-SIB is changed from the eNB, the UE newly acquires a MTC-SIB. Further, after the MTC-SIB is acquired, when an expiration date of the MTC-SIB elapses, the UE newly acquires a MTC-SIB.

(Overview of MTC-SIB Transmission/Reception Operation)

An overview of the MTC-SIB transmission/reception operation according to the present embodiment will be described below.

In the present embodiment, two transmission modes are defined as a MTC-SIB transmission mode. One is an automatic mode, and the other is a trigger mode. The use of the two transmission modes is an example, and three or more transmission modes may be used.

In the automatic mode, the eNB periodically transmits the MTC-SIB according to a preset period. The automatic mode is a mode applied when there is a request for the MTC-SIB constantly. There is recognized as being a request for the MTC-SIB constantly, for example, when the number of UEs (MTC-UEs) RRC-connected to the eNB is larger than a predetermined threshold value or the like. Further, there is recognized as being a request for the MTC-SIB constantly when an amount of traffic transmitted from the eNB to the UE side is larger than a predetermined threshold value or when an amount of traffic received from the UE side by the eNB is larger than a predetermined threshold value.

In the trigger mode, the eNB transmits the MTC-SIB when a signal serving as a trigger (a trigger signal) is received from the UE, and the eNB does not transmit the MTC-SIB when the trigger signal is not received although a transmission opportunity of the MTC-SIB comes. The trigger mode is a mode applied when a request for the MTC-SIB is small. The request for the MTC-SIB is recognized as being small, for example, when the number of UEs RRC-connected to the eNB is smaller than a predetermined threshold value or the like. The eNB switches the MTC-SIB transmission mode based on the traffic state and the like related to the MTC-UE.

Figure 3:
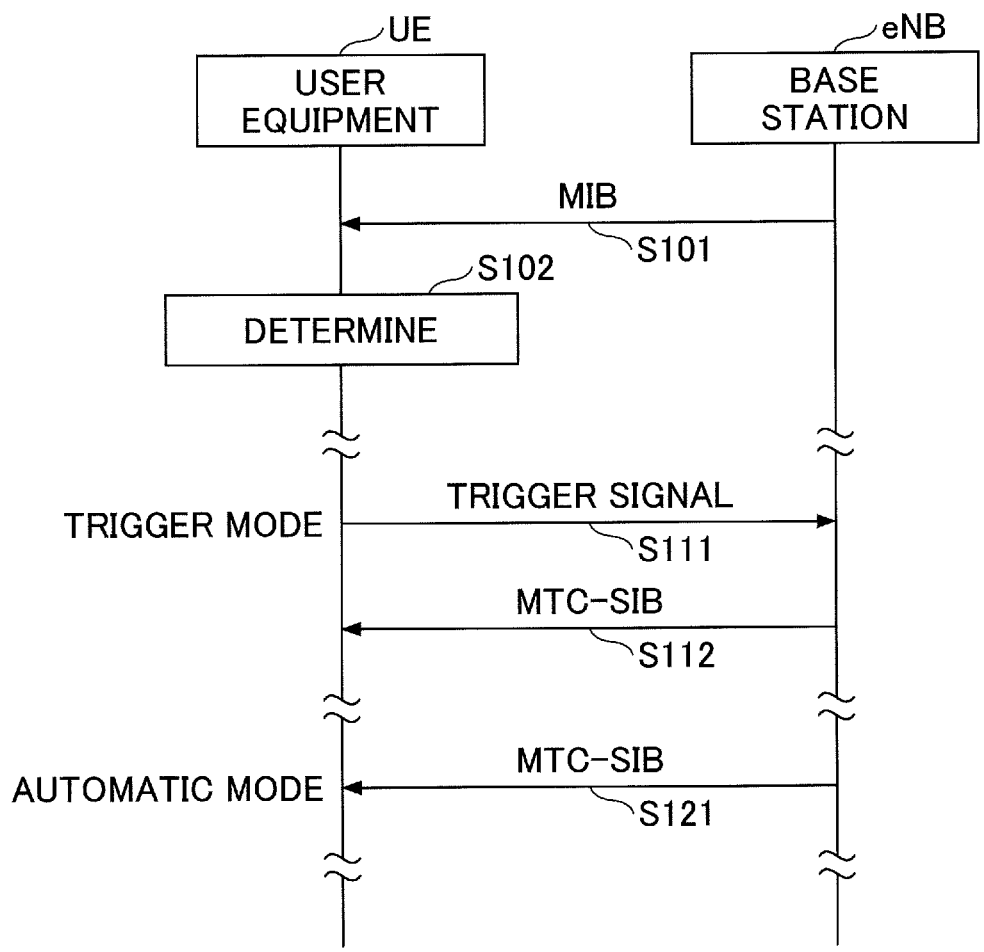
FIG. 3 is a diagram illustrating an operation sequence according to the present embodiment.

An example of the MTC-SIB transmission/reception operation between the UE and the eNB according to the present embodiment will be described with reference to FIG. 3.

In step S101, a master information block (MIB) is transmitted from the eNB, and the UE receives the MIB. The MIB is minimum information necessary for a connection with a system such as a system bandwidth or broadcast information including basic system information necessary for receiving the MTC-SIB. For example, the MIB is transmitted through a physical broadcast channel (PBCH). In the present embodiment, instruction information indicating a current MTC-SIB transmission mode is included in the MIB. In the present embodiment, the instruction information is indicated by one or more bits, and the instruction information is hereinafter referred to as an "instruction bit." Spare bits are included in the existing MIB (Non-Patent Document 1), and when an MIB according to the present embodiment is configured based on the existing MIB, all or some of the spare bits can be used as the instruction bit.

The embodiment of the present invention will be described below on the premise that the instruction bit is included in the MIB, but the MTC-SIB transmission mode may be instructed by any other method. For example, by instructing the transmission mode implicitly according to a transmission position of a synchronization signal, it is possible to reduce the number of bits of the MIB. In the case where the this instruction method is implemented in LTE, for example, different transmission frames of a primary synchronization signal (PSS) and a secondary synchronization signal (SSS) may be used between the automatic mode and the trigger mode so that the UE can implicitly recognize the transmission mode from the position relation of both synchronization signals. As an example, in the case of the automatic mode, the PSS is arranged in A-th and B-th subframes, and the SSS is arranged in C-th and D-th subframes, and in the case of the trigger mode, the PSS and the SSS are arranged in different subframes from in the automatic mode.

The UE that has received the MIB reads the instruction bit from the MIB and determines whether the current transmission mode is the automatic mode or the trigger mode according to the instruction bit (step S102).

When the instruction bit indicates the trigger mode, the UE determines that the current transmission mode is the trigger mode. Then, when the MTC-SIB is acquired, the UE transmits the trigger signal to the eNB (step S111). The eNB that has received the trigger signal transmits the MTC-SIB (step S112). The trigger signal transmitted from the UE to the eNB includes identification information (for example, a number) of the MTC-SIB that the UE desires to acquire. The eNB transmits an MTC-SIB identified by the identification information at the transmission opportunity of the MTC-SIB. Further, the trigger signal may not include the identification information of the MTC-SIB. In this case, for example, the eNB that has received the trigger signal transmits all of MTC-SIBs at corresponding transmission opportunities of the respective MTC-SIBs.

As the method of transmitting the MTC-SIB through the eNB, similarly to the existing SIB, the MTC-SIB is transmitted through a broadcast channel (for example, a BCCH). However, the present invention is not limited thereto, and the MTC-SIB may be individually transmitted to the UE that has transmitted the trigger signal.

When the instruction bit indicates the automatic mode, the UE determines that the current mode is the automatic mode. Then, the UE receives an MTC-SIB at the transmission opportunity (transmission timing) of the MTC-SIB that the UE desires to acquire (step S121).

(Operation of eNB)

Figure 4:
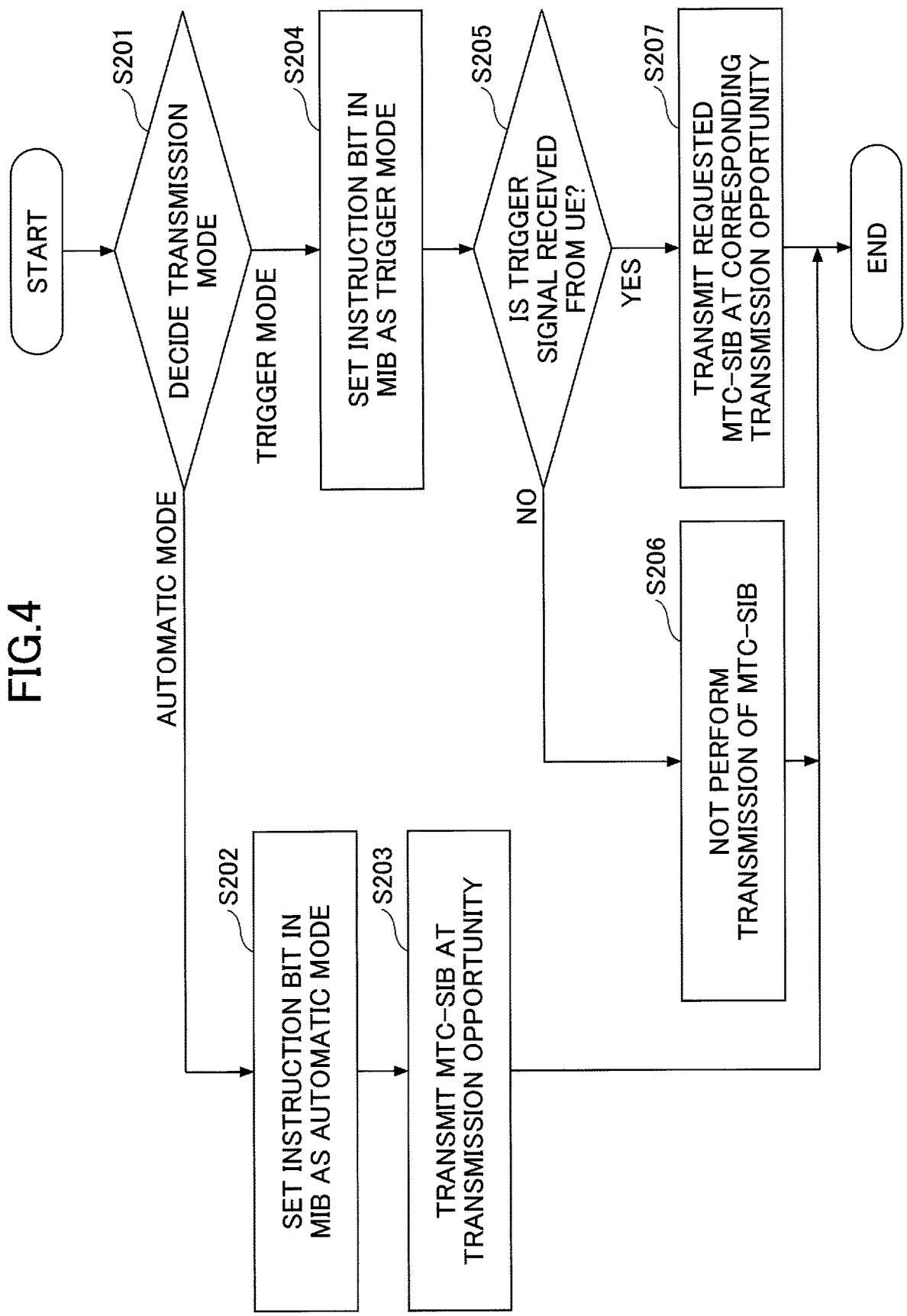
FIG. 4 is a flowchart illustrating an operation of an eNB.

Next, an operation of the eNB side will be described with reference to a flowchart of FIG. 4. First, an operation of the flow of FIG. 4 is performed under the assumption that information indicating the transmission opportunity (transmission occasion) of each MTC-SIB to be used (for example, information indicating a transmission period, a transmission start timing, or the like) is set in the eNB and the UE. The setting of the information may be set in a setting which is fixed in advance or may be a setting performed such that the eNB decides the information and gives a notification of the information to the UE. In the latter case, the notification to the UE may be given through an SIB'.

In step S201, the eNB decides the transmission mode of the MTC-MIB. The method of deciding the transmission mode will be described later.

When the mode decided in step S201 is the automatic mode, the process proceeds to step S202, and the eNB sets the instruction bit in the MIB which is periodically transmitted as the automatic mode. In the automatic mode, the eNB transmits an MTC-SIB at the transmission opportunity of the MTC-SIB (step S203).

When the mode decided in step S201 is the trigger mode, the process proceeds to step S204, and the eNB sets the instruction bit in the MIB which is periodically transmitted as the trigger mode. In the trigger mode, the eNB determines whether the eNB receives the trigger signal from the UE (step S205). When the trigger signal is not received, although the transmission opportunity of an MTC-SIB comes, the MTC-SIB is not transmitted (the transmission is skipped) (step S206). On the other hand, when the trigger signal is received, the eNB transmits the MTC-SIB requested through the trigger signal at the transmission opportunity of the MTC-SIB (step S207).

(Operation of UE)

Figure 5:
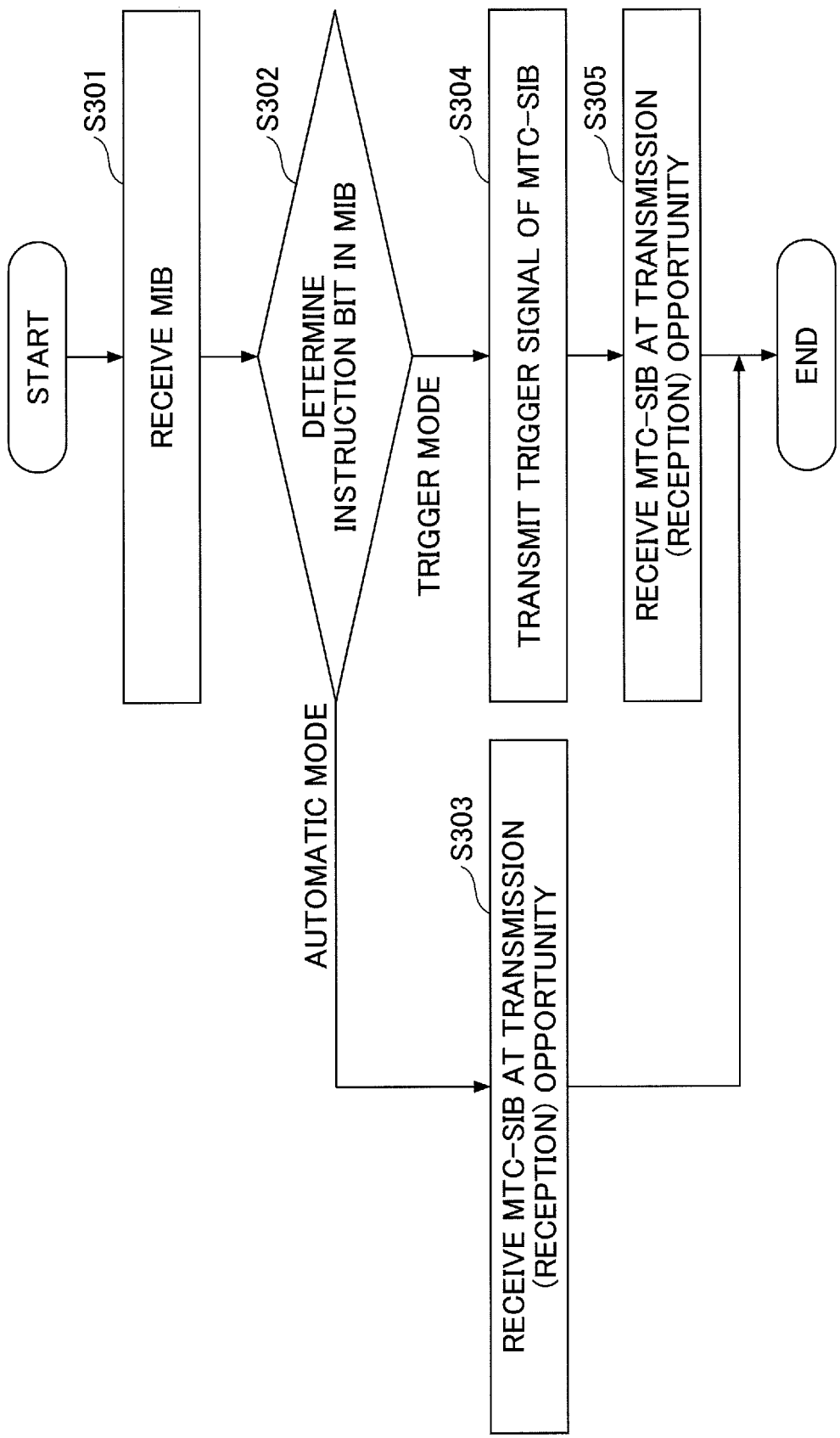
FIG. 5 is a flowchart illustrating an operation of a UE.

Next, an operation of the UE side will be described with reference to the flowchart of FIG. 5. First, as in the case of FIG. 4, as a precondition for performing the operation in the flow of FIG. 5, information indicating transmission opportunity (transmission occasions) of each MTC-SIB used (for example, information indicating a transmission cycle, transmission start timing Etc.) are set in the eNB and the UE.

In step S301, the UE receives the MIB. In step S302, the UE reads the instruction bit in the MIB and performs determination. When the instruction bit is determined to indicate the automatic mode, the process proceeds to step S303, and the UE receives an MTC-SIB at the transmission opportunity of the MTC-SIB.

If the instruction bit is determined to indicate the trigger mode, the process proceeds to step S304, and the UE transmits the trigger signal for requesting transmission of an MTC-SIB. The eNB receives the trigger signal. As described above with reference to FIG. 4, the eNB that has received the trigger signal of the MTC-SIB transmits the MTC-SIB at the transmission opportunity of the requested MTC-SIB. In step S305 of FIG. 5, the UE receives the MTC-SIB at the transmission opportunity (at a reception opportunity at a point of view of the UE) (step S305).

(Transmission Mode Decision Method)

Next, the method of deciding the MTC-SIB transmission mode through the eNB which is performed in step S201 of FIG. 4 will be described.

The transmission mode decision method is not limited to a specific method, but for example, the eNB monitors the number of UEs (MTC-UEs) which are simultaneously RRC-connected (for example, an average value per predetermined time length), sets the transmission mode to the trigger mode when the number of UEs (MTC-UEs) which are simultaneously RRC-connected is a predetermined threshold value or less, and sets the transmission mode to the automatic mode when the number of UEs (MTC-UEs) which are simultaneously RRC-connected exceeds a predetermined threshold value. Further, the eNB monitors an amount of uplink traffic and/or downlink traffic between the eNB and the UE side (for example, an average value per predetermined time length), sets the transmission mode to the trigger mode when the amount of uplink traffic and/or downlink traffic is a predetermined threshold value or less, and sets the transmission mode to the automatic mode when the amount of uplink traffic and/or downlink traffic exceeds a predetermined threshold value.

Further, the eNB may not determine the automatic mode/trigger mode based on the monitoring of traffic or the like. In this case, for example, the eNB decides the transmission mode according to an instruction indicating the automatic mode or the trigger mode from an external system (for example, an operation system).

Further, the eNB may monitor the number of trigger signals received from the UE in a trigger mode state (for example, the number of trigger signals per unit time), set the transmission mode to the automatic mode when the number of trigger signals exceeds a predetermined threshold value, and perform control such that switching to the trigger mode is automatically performed after the automatic mode is continued for a predetermined time. A "predetermined time" is, for example, a time in which bursty traffic from the UE is expected to continue. For example, such a time can be obtained by statistical analysis of traffic.

Further, based on a deployment status, communication method and the like of the MTC-UE in an area in which the eNB is located, a transmission mode time table (for example, a table indicating that a period from 00:00 to 06:00 is the automatic mode, a period from 06:00 to 12:00 is the trigger mode, and the like) may be generated, information of the time table may be set in the eNB, and the eNB may perform switching between the automatic mode and the trigger mode according to the time table.

(Exemplary Operation in Trigger Mode)

Next, an exemplary operation in the trigger mode will be described with reference to FIGS. 6A and 6B. In the example illustrated in FIGS. 6A and 6B, a preamble of a random access channel (RACH) is used as the trigger signal. The use of the preamble of the RACH is an example. In this example, as illustrated in the table of FIG. 6A, the preamble is associated with a requested MTC-MIB. The information of the table is retained in both the UE and the eNB. FIG. 6A illustrates an example in which the preamble is associated with the MTC-SIB in a one-to-one correspondence, but a plurality of MTC-SIBs may be associated with one preamble.

Then, as illustrated in FIG. 6B, for example, when a UE 1 desires to acquire an MTC-SIB1, in step S401, the UE 1 transmits a preamble X using the PRACH (step S401). The eNB that has received the preamble X transmits the MTC-SIB1 at a transmission opportunity (B1) of the MTC-SIB1 corresponding to the preamble X. In this example, since there is no trigger signal at a next transmission opportunity (B2) of the MTC-SIB1, the transmission of the MTC-SIB1 is not performed. However, this is an example, and a plurality of corresponding MTC-SIBs may be transmitted in response to one reception of the trigger signal.

In step S402, a UE 2 transmits a preamble Y, and in response to the transmission of the preamble Y, the eNB transmits the MTC-SIB2 at a transmission opportunity (A2) of an MTC-SIB2. At a previous transmission opportunity (A1), since there is no trigger signal, the MTC-SIB2 has not been transmitted.

As the premise of FIG. 6B, both the UE 1 and the UE 2 receive the MIB from the eNB. In this example, information of a sequence used for generation of the preamble, resource information of the PRACH used for transmission of the preamble, and the like (which are referred to as "preamble transmission information") are included in the MIB. Further, the eNB may include the preamble transmission information in the MIB only when the transmission mode is the trigger mode. Furthermore, the eNB may include the preamble transmission information in another signal (for example, an SIB2).

In this example, the transmission of the preamble may also serve as a RRC connection setup procedure or the like or may be performed only for acquiring the MTC-SIB.

(Exemplary Operation Associated with MTC Traffic)

FIG. 7 is a diagram illustrating an MTC-SIB transmission operation according to the present embodiment in association with MTC traffic.

In the example illustrated in FIG. 7, an MTC-SIB transmission operation related to an interval indicated by A in which an MTC traffic amount is large is illustrated. In other words, at a start timing T1 of the interval indicated by A, the eNB switches the transmission mode from the trigger mode to the automatic mode, and transmits the MTC-SIB without receiving the trigger signal. Then, at an end time point T2 of the interval indicated by A, the eNB switches the transmission mode from the automatic mode to the trigger mode. Further, in FIG. 7, it is illustrated that the eNB receives the trigger signal and transmits the MTC-SIB after T2.

(Device Configuration)

<UE>

Figure 8:
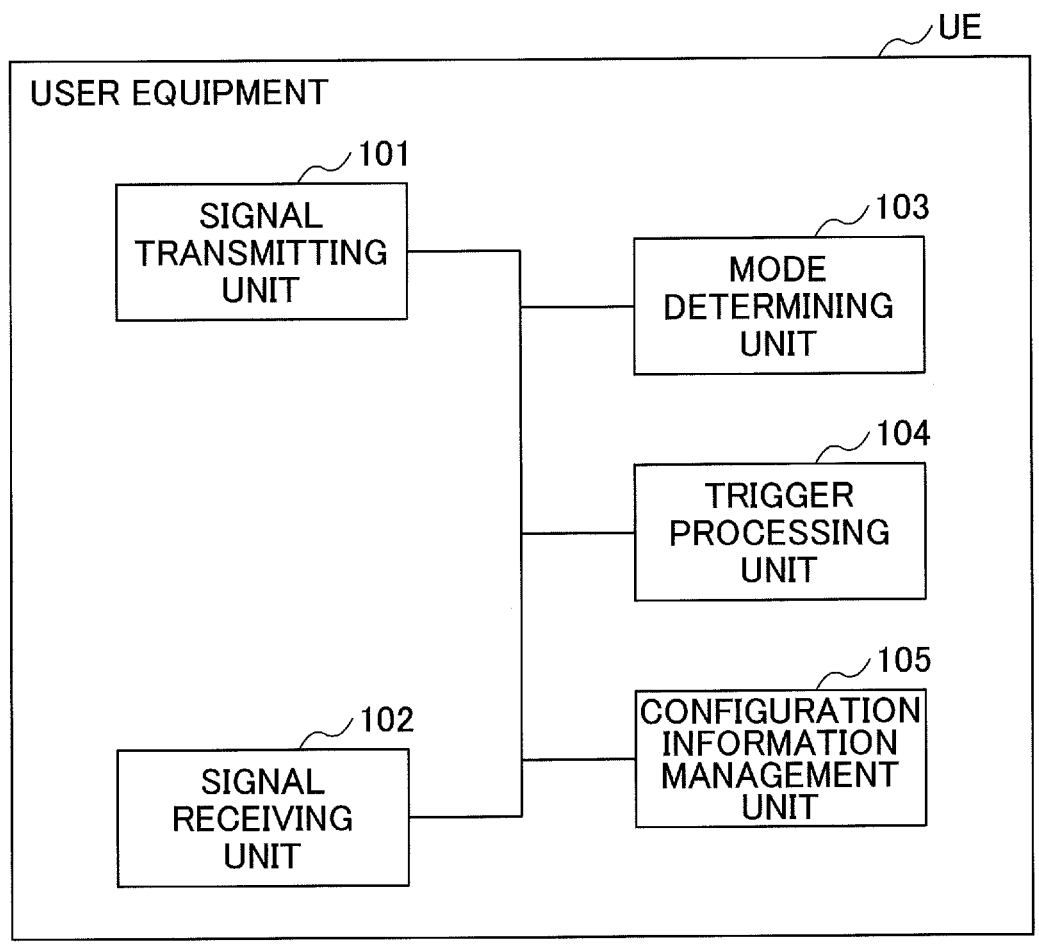
FIG. 8 is a configuration diagram of a user equipment UE.

FIG. 8 illustrates a functional configuration diagram of the UE according to the present embodiment. The UE illustrated in FIG. 8 can performs all the processes of the UE described above.

As illustrated in FIG. 8, the UE includes a signal transmitting unit 101, a signal receiving unit 102, a mode determining unit 103, a trigger processing unit 104, and a configuration information management unit 105. FIG. 8 illustrates only functional units of the UE particularly related to the embodiment of the present invention, and also has a function (not illustrated) of performing at least operations conforming to LTE. Further, the functional configuration illustrated in FIG. 8 is merely an example. Any classification or any name may be used as a function classification or a name of a functional unit as long as the operation of the UE according to this embodiment can be performed.

The signal transmitting unit 101 has a function of generating various kinds of signals of the physical layer from signals of a higher layer to be transmitted from the UE and wirelessly transmitting the signals. The signal receiving unit 102 has a function of wirelessly receiving various kinds of signals from the eNB or the like and acquiring a signal of the higher layer from the received signal of the physical layer. Further, the signal receiving unit 102 receives various kinds of configuration information according to the MIB, the SIB, an RRC signal, a MAC signal, a PHY signal, or the like transmitted from the eNB, and stores the configuration information in the configuration information management unit 105. Other functional units operate according to the configuration information. For example, the signal receiving unit 102 detects the transmission opportunity of the MTC-SIB (the reception opportunity from the point of view of the UE) based on the configuration information and receives the MTC-SIB at the opportunity.

The mode determining unit 103 reads the instruction bit from the information of the MIB received through the signal receiving unit 102 and determines whether the current transmission mode is the trigger mode or the automatic mode based on the instruction bit. Further, the mode determining unit 103 can determine whether the current transmission mode is the trigger mode or the automatic mode based on instruction information which is notified of using a method other than the instruction bit of the MIB (for example, instruction information using the synchronization signal described above). The mode determining unit 103 may be included in the signal receiving unit 102.

When the mode determining unit 103 determines that the transmission mode is the automatic mode, a notification indicating that the transmission mode is the automatic mode is given to the signal receiving unit 102 and the trigger processing unit 104. Based on the notification, the signal receiving unit 102 performs the reception operation at each transmission opportunity of the MTC-SIB. When the mode determining unit 103 determines that the transmission mode is the trigger mode, a notification indicating that the transmission mode is the trigger mode is given to the signal receiving unit 102 and to the trigger processing unit 104. The signal receiving unit 102 that has received the notification of the trigger mode stops receiving the MTC-SIB in the automatic mode.

Upon receiving the notification indicating that the transmission mode is the trigger mode from the mode determining unit 103, the trigger processing unit 104 generates the trigger signal, and transmits the trigger signal through the signal transmitting unit 101. The trigger processing unit 104 may be included in the signal transmitting unit 101. The trigger signal includes, for example, identification information of one or more MTC-SIBs that the UE desires to acquire. As described above, the preamble is an example of the trigger signal. Further, after the trigger signal is transmitted, the signal receiving unit 102 receives the MTC-SIB at the transmission opportunity of the MTC-SIB requested through the trigger signal. The trigger processing unit 104 performs the transmission process for the trigger signal each time it is necessary to acquire the MTC-SIB until switching to the automatic mode is performed after the transmission mode is switched to the trigger mode.

As described above, various kinds of configuration information are stored in the configuration information management unit 105, and the other functional units operate according to the configuration information.

The entire configuration of the UE illustrated in FIG. 8 may be implemented entirely by a hardware circuit (for example, one or more IC chips), or a part of the configuration may be implemented by a hardware circuit, and the remaining parts may be implemented by a CPU and a program.

Figure 9:
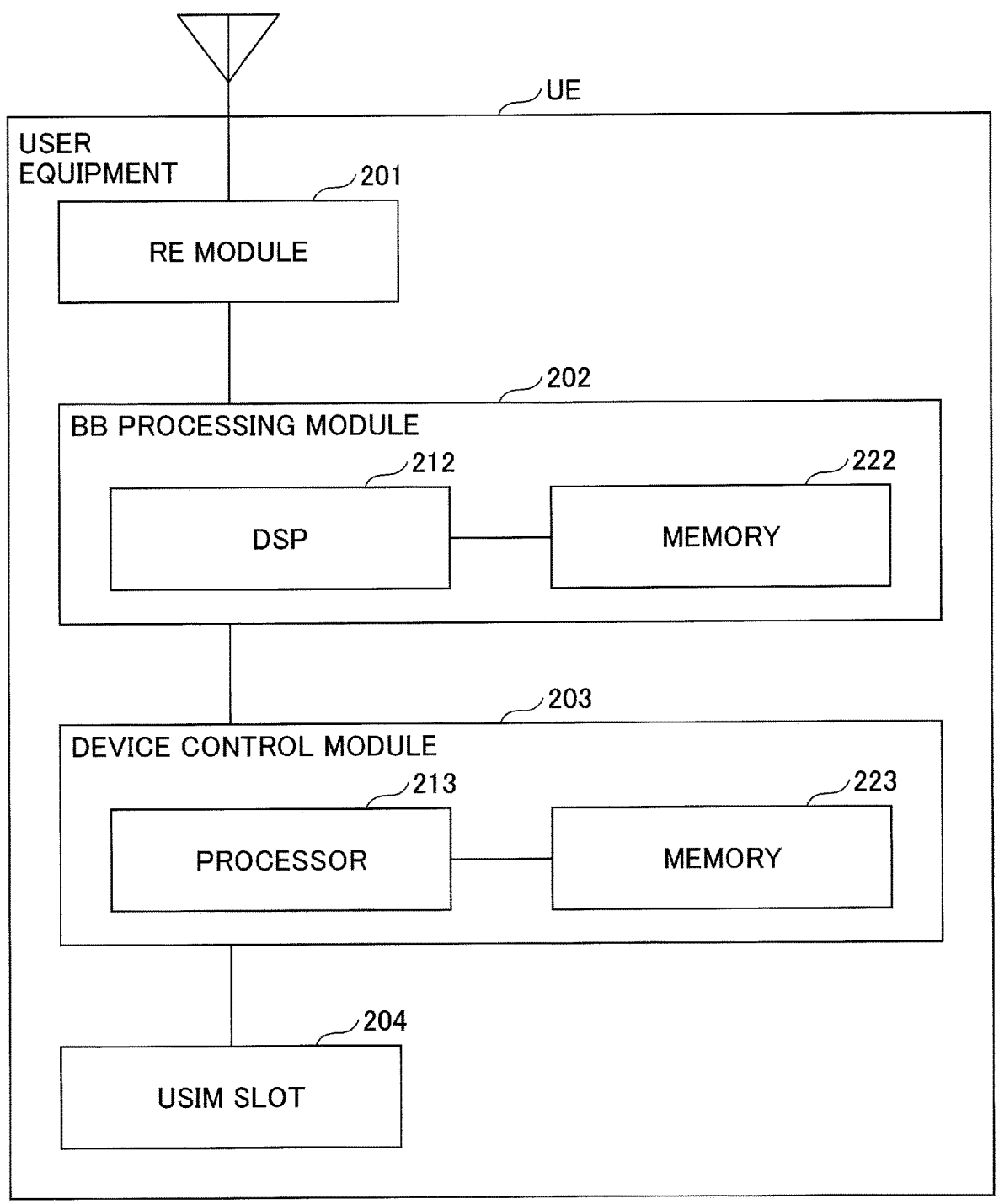
FIG. 9 is a HW configuration diagram of a user equipment UE.

FIG. 9 is a diagram illustrating an example of a hardware (HW) configuration of the UE. FIG. 9 illustrates a configuration that is closer to an implementation example than that of FIG. 8. As illustrated in FIG. 9, the UE includes a radio equipment (RE) module 201 that performs processing related to a radio signal, a baseband (BB) processing module 202 that performs baseband signal processing, a device control module 203 that performs processing of a higher layer or the like, and a USIM slot 204 which is an interface for accessing a USIM card.

The RE module 201 performs digital-to-analog (D/A) conversion, modulation, frequency transform, power amplification, and the like on a digital baseband signal received from the BB processing module 202, and generates a radio signal to be transmitted from an antenna. Further, the RE module 201 performs frequency transform, analog to digital (A/D) conversion, demodulation, and the like on a received radio signal, generates a digital baseband signal, and transfers the digital baseband signal to the BB processing module 202. The RE module 201 includes, for example, the functions of the physical layer of the signal transmitting unit 101 and the signal receiving unit 102 in FIG. 8.

The BB processing module 202 performs a process of converting an IP packet into a digital baseband signal and vice versa. A digital signal processor (DSP) 212 is a processor that performs signal processing in the BB processing module 202. A memory 222 is used as a work area of the DSP 212. The BB processing module 202 includes, for example, a function of a layer higher than the physical layer in the signal transmitting unit 101 and the signal receiving unit 102, the mode determining unit 103, the trigger processing unit 104, and the configuration information management unit 105 in FIG. 8. All or some of the mode determining unit 103, the trigger processing unit 104, and the configuration information management unit 105 may be included in the device control module 203.

The device control module 203 performs protocol processing of the IP layer, various kinds of application processing, and the like. A processor 213 is a processor that performs processing performed by the device control module 203. A memory 223 is used as a work area of the processor 213. Further, the processor 213 reads or writes data from or in the USIM via the USIM slot 204.

<eNB>

Figure 10:
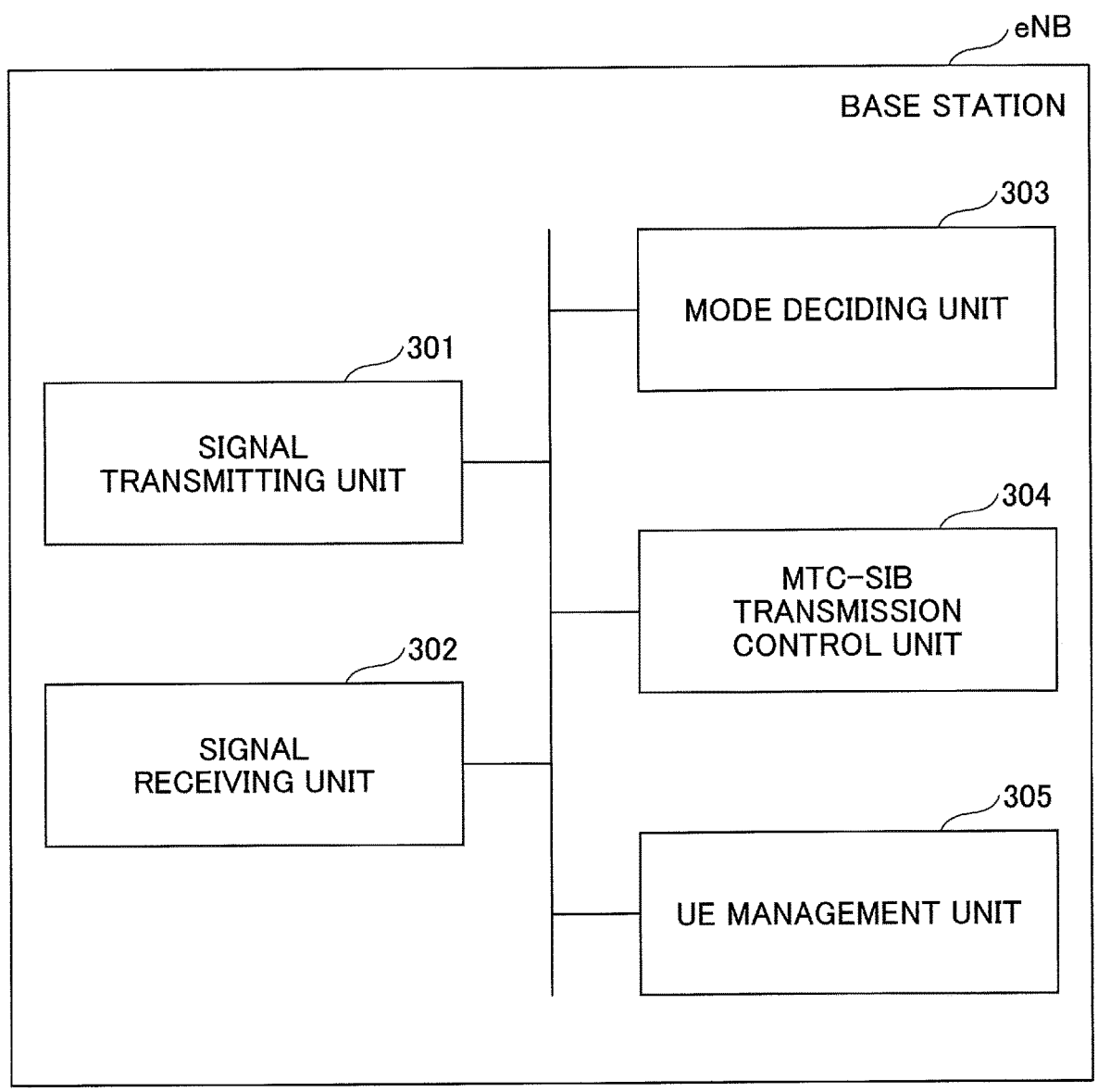
FIG. 10 is a configuration diagram of a base station eNB.

FIG. 10 illustrates a functional configuration diagram of the eNB that performs the eNB side operation described in the present embodiment. As illustrated in FIG. 10, the eNB includes a signal transmitting unit 301, a signal receiving unit 302, a mode deciding unit 303, an MTC-SIB transmission control unit 304, and an UE management unit 305. FIG. 10 illustrates only functional units of the eNB particularly related to the embodiment of the present invention and also has a function (not illustrated) of operating as at least a base station in a mobile communication system conforming to LTE. Further, the functional configuration illustrated in FIG. 10 is merely an example. Any classification or any name may be used as a function classification or a name of a functional unit as long as the operation according to this embodiment can be performed.

The signal transmitting unit 301 has a function of generating various kinds of signals of the physical layer from signals of a higher layer to be transmitted from the eNB and wirelessly transmitting the signals. The signal receiving unit 302 has a function of wirelessly receiving various kinds of signals from the UE and acquiring a signal of the higher layer from the received signal of the physical layer.

The mode deciding unit 303 decides the MTC-SIB transmission mode using the above-described method. The mode deciding unit 303 notifies the MTC-SIB transmission control unit 304 of the decided mode. For example, when the transmission mode is decided based on the number of UEs (MTC-UEs) which are RRC-connected, the mode deciding unit 303 acquires information indicating the number of UEs which are RRC-connected from the UE management unit 305, and decides the transmission mode. Further, for example, when the transmission mode is decided based on the instruction given from the external system, the mode deciding unit 303 receives the instruction from the external system and decides the transmission mode according to the instruction.

The MTC-SIB transmission control unit 304 performs MTC-SIB transmission control according to the transmission mode decided by the mode deciding unit 303. The MTC-SIB transmission control unit 304 may be included in the signal transmitting unit 301. For example, when the transmission mode is the automatic mode, the MTC-SIB transmission control unit 304 generates the MTC-SIB and causes the MTC-SIB to be transmitted to the signal transmitting unit 301 at the transmission opportunity of the MTC-SIB. Further, when the transmission mode is the trigger mode, the signal receiving unit 302 transfers the trigger signal received from the UE to the MTC-SIB transmission control unit 304, and the MTC-SIB transmission control unit 304 generates the MTC-SIB requested through the trigger signal and transmits the MTC-SIB to the signal transmitting unit 301 at the transmission opportunity of the MTC-SIB. Further, for example, the MTC-SIB transmission control unit 304 causes the MIB including the instruction bit corresponding to the transmission mode to be transmitted to the signal transmitting unit 301. The MTC-SIB transmission control unit 304 can also cause a synchronization signal having a configuration according to the transmission mode to be transmitted to the signal transmitting unit 301.

The UE management unit 305 acquires a state of the UE (here, the MTC-UE) (an RRC connection, an RRC idle, a RACH procedure, a handover, or the like) from the signal transmitting unit 301 and the signal receiving unit 302, and retains the state for each UE.

Figure 11:
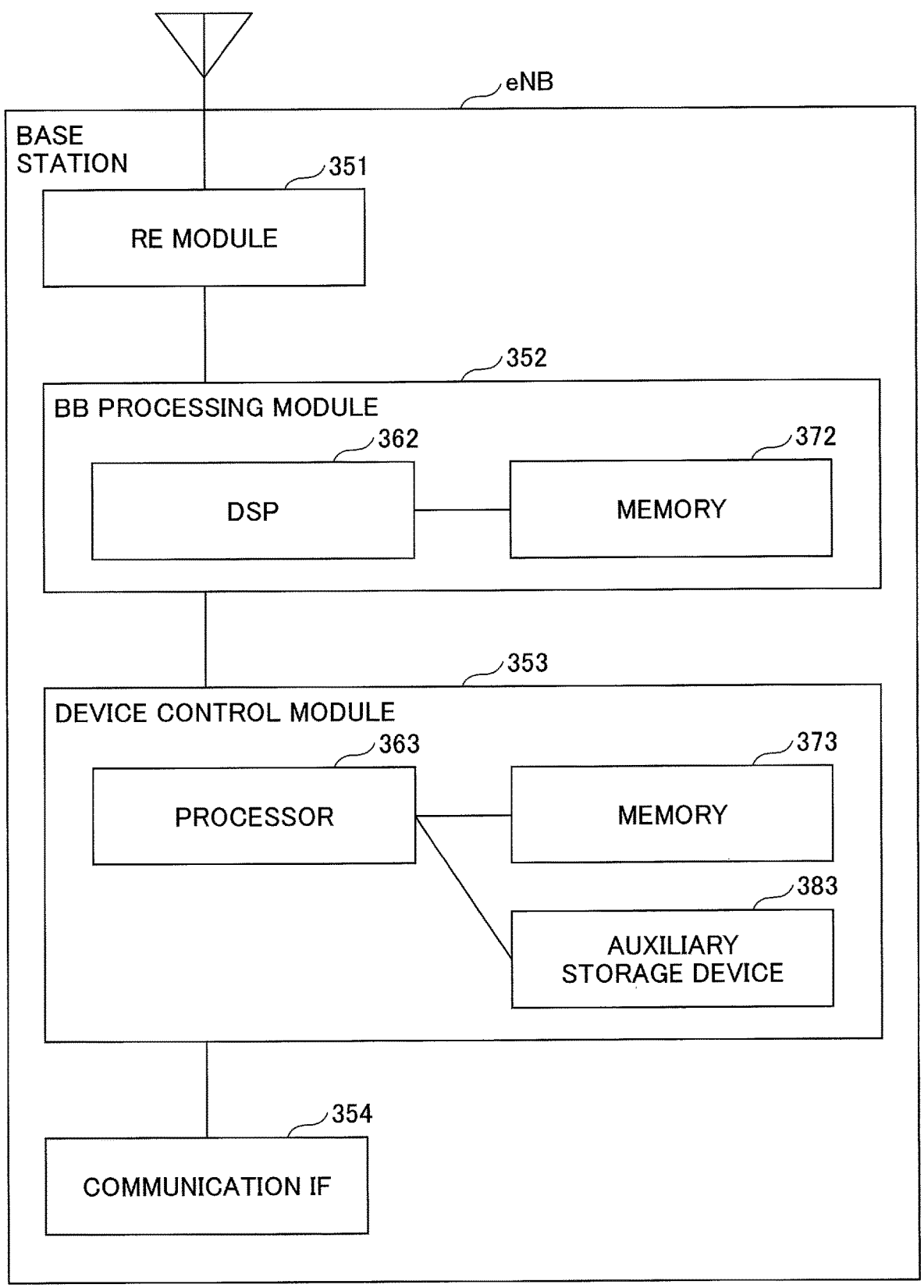
FIG. 11 is a HW configuration diagram of a base station eNB.

The entire configuration of the eNB illustrated in FIG. 10 may be implemented by a hardware circuit (for example, one or more IC chips), or a part of the configuration may be implemented by a hardware circuit, and the remaining parts may be implemented by a CPU and a program, FIG. 11 is a diagram illustrating an example of a hardware (HW) configuration of the eNB. FIG. 11 illustrates a configuration that is closer to an implementation example than that of FIG. 10. As illustrated in FIG. 11, the base station eNB includes an RE module 351 that performs processing related to a radio signal, a BB processing module 352 that performs baseband signal processing, a device control module 353 that performs processing of a higher layer or the like, and a communication IF 354 which is an interface of a connection with a network.

The RE module 351 performs D/A conversion, modulation, frequency transform, power amplification, and the like on a digital baseband signal received from the BB processing module 352, and generates a radio signal to be transmitted from an antenna. Further, the RE module 351 performs frequency transform, analog to digital (A/D) conversion, demodulation, and the like on a received radio signal, generates a digital baseband signal, and transfers the digital baseband signal to the BB processing module 352. The RE module 351 includes, for example, the functions of the physical layer in the signal transmitting unit 301 and the signal receiving unit 302 in FIG. 10.

The BB processing module 352 performs a process of converting an IP packet into a digital baseband signal and vice versa. A DSP 362 is a processor that performs signal processing in the BB processing module 352. A memory 372 is used as a work area of the DSP 352. For example, the BB processing module 352 has a function of a layer higher than the physical layer in the signal transmitting unit 301 and the signal receiving unit 302, the mode deciding unit 303, the MTC-SIB transmission control unit 304, and the UE management unit 305 in FIG. 10. All or some of the functions of the mode deciding unit 303, the MTC-SIB transmission control unit 304, and the UE management unit 305 may be included in the device control module 353.

The device control module 353 performs protocol processing of the IP layer, OAM processing, and the like. A processor 363 is a processor that performs processing performed by the device control module 353. A memory 373 is used as a work area of the processor 363. An auxiliary storage device 383 is, for example, an HDD or the like, and stores various kinds of configuration information and the like for the operation of the base station eNB.

The configuration (function classification) of each of the devices illustrated in FIGS. 8 to 11 are merely an example of a configuration for implementing the process described in the present embodiment. An implementation method thereof (a specific arrangement of functional units, names thereof, and the like) is not limited to a specific implementation method as long as the process described in the present embodiment can be implemented.

Conclusion of Embodiment

As described above, according to the present embodiment, provided is a user equipment in a mobile communication system including a base station and the user equipment, including: a mode determining unit that receives instruction information indicating a transmission mode of broadcast information from the base station and determines the transmission mode based on the instruction information; and a receiving unit that performs a reception operation of the broadcast information according to the transmission mode determined by the mode determining unit.

Through the above configuration, it is possible to reduce unnecessary transmission and reception of the broadcast information in the mobile communication system.

The user equipment may further include a transmitting unit that transmits a trigger signal for requesting transmission of the broadcast information to the base station when the transmission mode is a trigger mode in which the base station transmits the broadcast information based on a trigger signal transmitted from the user equipment. In this case, the receiving unit receives the broadcast information at a transmission opportunity of the broadcast information after the trigger signal is transmitted. Through this configuration, the base station can transmit the broadcast information as necessary, and the user equipment can receive (acquire) the broadcast information as necessary.

The trigger signal is, for example, a preamble transmitted through a random access channel. Through this configuration, it is possible to implement the trigger signal using an existing mechanism, and it is easy to implement it. Further, the trigger signal may include identification information of the broadcast information to be requested. Through this configuration, the user equipment can efficiently notify the base station of desired broadcast information.

Further, when the transmission mode is an automatic mode in which the base station periodically transmits the broadcast information without receiving the trigger signal from the user equipment, the receiving unit may receive the broadcast information at the transmission opportunity of the broadcast information. Through this configuration, for example, it is possible to perform efficient transmission and reception of the broadcast information when a plurality of user equipments are connected, and large traffic occurs.

According to the present embodiment, provided is a base station in a mobile communication system including the base station and a user equipment, including: a mode deciding unit that decides a transmission mode of broadcast information; and a transmission unit that transmits instruction information indicating the transmission mode decided by the mode deciding unit and performs a transmission operation of the broadcast information according to the transmission mode.

According to the above configuration, it is possible to reduce unnecessary transmission and reception of the broadcast information in the mobile communication system.

The base station may further include a receiving unit that receives a trigger signal for requesting transmission of the broadcast information from the user equipment that has received the instruction information when the transmission mode is a trigger mode in which the base station transmits the broadcast information based on the trigger signal transmitted from the user equipment. In this case, the transmitting unit transmits the broadcast information at a transmission opportunity of the broadcast information after the trigger signal is received. Through this configuration, the base station can transmit the broadcast information as necessary, and the user equipment can receive (acquire) the broadcast information as necessary.

Further, when the transmission mode is an automatic mode in which the base station periodically transmits the broadcast information without receiving the trigger signal from the user equipment, the transmitting unit may transmit the broadcast information at the transmission opportunity of the broadcast information. Through this configuration, for example, it is possible to perform efficient transmission and reception of the broadcast information when a plurality of user equipments are connected, and large traffic occurs.

The exemplary embodiment of the present invention has been described above, but the disclosed invention is not limited to the above embodiment, and those skilled in the art would understand that various modified examples, revised examples, alternative examples, substitution examples, and the like can be made. In order to facilitate understanding of the invention, specific numerical value examples have been used for description, but the numerical values are merely examples, and certain suitable values may be used unless otherwise stated. A classification of items in the above description is not essential to the present invention, matters described in two or more items may be combined and used as necessary, and a matter described in one item may be applied to a matter described in another item (unless inconsistent). The boundary between functional units or processing units in a functional block diagram does not necessarily correspond to the boundary between physical parts. Operations of a plurality of functional units may be performed physically by one component, or an operation of one functional unit may be performed physically by a plurality of parts. For the sake of convenience of description, the UE and the eNB have been described using the functional block diagrams, but such devices may be implemented by hardware, software, or a combination thereof. Software executed by the processor included in the user equipment UE according to the embodiment of the present invention and software executed by the processor included in the base station eNB according to the embodiment of the present invention may be stored in a random access memory (RAM), a flash memory, a read only memory (ROM), an EPROM, an EEPROM, a register, a hard disk (HDD), a removable disk, a CD-ROM, a database, a server, or any other appropriate storage medium.

Supplement of Embodiment

Notification of information is not limited to the aspects/embodiments described in this specification, but may be performed using other methods. For example, the notification of information may be performed physical layer signaling (such as downlink control information (DCI) or uplink control information (UCI)), upper layer signaling (such as radio resource control (RRC) signal, medium access control (MAC) signaling, or broadcast information (master information block (MIB) and system information block (SIB))), other signals, or combinations thereof. The RRC signaling may be referred to as an RRC message and may be, for example, an RRC connection setup message or an RRC connection reconfiguration message.

The aspects/embodiments described in this specification may be applied to systems employing long term evolution (LTE), LTE-advanced (LTE-A), SUPER 3G, IMT-Advanced, 4G, 5G, future radio access (FRA), W-CDMA (registered trademark), GSM (registered trademark), CDMA2000, ultra mobile broadband (UMB), IEEE 802.11 (Wi-Fi), IEEE 802.16 (WiMAX), IEEE 802.20, ultra-wideband (UWB), Bluetooth (registered trademark), or other appropriate systems and/or next-generation systems to which the systems are extended.

The processing procedures, the sequences, and the like of the aspects/embodiments described above in this specification may be changed in the order as long as they are not incompatible with each other. For example, in the methods described in this specification, various steps as elements are described in an exemplary order and the methods are not limited to the described order.

Specific operations which are performed by the base station in this specification may be performed by an upper node thereof in some cases. In a network including one or more network nodes including a base station, various operations which are performed to communicate with a user equipment UE can be apparently performed by the base station and/or network nodes (for example, an MME or an S-GW can be considered but the network nodes are not limited thereto) other than the base station. A case in which the number of network nodes other than the base station is one has been described above, but a combination of plural different network nodes (for example, an MME and an S-GW) may be used.

The aspects described in this specification may be used alone, may be used in combination, or may be switched with implementation thereof.

The user equipment UE may also be referred to as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or several appropriate terms by those skilled in the art.

The base station may be referred to as an NodeB (NB), an enhanced NodeB (eNB), a base station, or some other appropriate terms by those skilled in the art.

The terms "determining (determining)" and "deciding (determining)" used in this specification may include various types of operations. For example, "determining" and "deciding" may include deeming that to perform judging, calculating, computing, processing, deriving, investigating, looking up (e.g., search in a table, a database, or another data structure), or ascertaining is to perform "determining" or "deciding". Furthermore, "determining" and "deciding" may include deeming that to perform receiving (e.g., reception of information), transmitting (e.g., transmission of information), input, output, or accessing (e.g., accessing data in memory) is to perform "determining" or "deciding". Furthermore, "determining" and "deciding" may include deeming that to perform resolving, selecting, choosing, establishing, or comparing is to perform "determining" or "deciding". Namely, "determining" and "deciding" may include deeming that some operation is to perform "determining" or "deciding".

An expression "on the basis of ~" which is used in this specification does not refer to only "on the basis of only ~," unless apparently described. In other words, the expression "on the basis of ~" refers to both "on the basis of only ~" and "on the basis of at least ~."

So long as terms "include" and "including" and modifications thereof are used in this specification or the appended claims, the terms are intended to have a comprehensive meaning similar to a term "comprising." A term "or" which is used in this specification or the claims is intended not to mean an exclusive or.

In the entire disclosure, for example, when an article such as a, an, or the is added in translation into English, such an article refers to including the plural unless otherwise recognized from the context.

The present invention is not limited to the above embodiments, and various modified examples, revised examples, alternative examples, substitution examples, and the like are included in the present invention without departing from the spirit of the present invention.

This application is based on and claims priority to Japanese patent application No. 2016-073461 filed on Mar. 31, 2016, and the entire contents of the Patent Application No. 2016-073461 are incorporated herein by reference.

EXPLANATIONS OF LETTERS OR NUMERALS eNB base station
UE user equipment
101 signal transmitting unit
102 signal receiving unit
103 mode determining unit
104 trigger processing unit
105 configuration information management unit
201 RE module
202 BB processing module
203 device control module
204 USIM slot 301 signal transmitting unit
302 signal receiving unit
303 mode deciding unit
304 MTC-SIB transmission control unit
305 UE management unit
351 RE module
352 BB processing module
353 device control module
354 communication IF

The invention claimed is:

1. A terminal comprising:
a receiver that:
receives, from a base station, second system information that includes bandwidth information and status information indicating whether first system information is broadcasted; and
receives, from the base station, information indicating a reception opportunity of the first system information; and
a transmitter that transmits, when the status information indicates that the first system information is not broadcasted, a random access preamble requesting transmission of the first system information to the base station,
wherein the terminal requests transmission of the first system information from the base station by transmitting a random access preamble when the first system information is not valid after a predetermined time from acquisition of the first system information.

2. The terminal as claimed in claim 1, wherein, when the status information indicates that the first system information is broadcasted, the receiver receives the first system information in a transmission occasion of the first system information.

3. A system information acquisition method executed by a terminal, comprising:
receiving, from a base station, second system information that includes bandwidth information and status information indicating whether first system information is broadcasted;
receiving, from the base station, information indicating a reception opportunity of the first system information;
transmitting, when the status information indicates that the first system information is not broadcasted, a random access preamble requesting transmission of the first system information to the base station; and
requesting, from the base station, transmission of the first system information by transmitting a random access preamble when the first system information is not valid after a predetermined time from acquisition of the first system information.

4. A base station comprising:
a transmitter that:
transmits, to a terminal, second system information that includes bandwidth information and status information indicating whether first system information is broadcasted; and
transmits, to the terminal, information indicating a reception opportunity of the first system information; and
a receiver that receives, when the status information indicates that the first system information is not broadcasted, a random access preamble requesting transmission of the first system information from the terminal,
wherein the receiver receives a random access preamble requesting transmission of the first system information from the terminal when the first system information is not valid after a predetermined time from acquisition of the first system information by the terminal.

5. A system comprising a terminal and a base station,
the terminal comprising:
a receiver that:
receives, from the base station, second system information that includes bandwidth information and status information indicating whether first system information is broadcasted; and
receives, from the base station, information indicating a reception opportunity of the first system information; and
a transmitter that transmits, when the status information indicates that the first system information is not broadcasted, a random access preamble requesting transmission of the first system information to the base station, and
the base station comprising:
a transmitter that:
transmits, to the terminal, the second system information that includes the bandwidth information and the status information indicating whether the first system information is broadcasted; and
transmits, to the terminal, the information indicating the reception opportunity of the first system information; and
a receiver that receives, when the status information indicates that the first system information is not broadcasted, the random access preamble requesting transmission of the first system information from the terminal,
wherein the terminal requests transmission of the first system information from the base station by transmitting a random access preamble when the first system information is not valid after a predetermined time from acquisition of the first system information.

* * * * *